(12) United States Patent
Gonzales

(10) Patent No.: US 7,616,887 B2
(45) Date of Patent: Nov. 10, 2009

(54) VIDEO CAMERA MONITOR SHIELD

(76) Inventor: Rolando Gonzales, 8981Helenjames Ave., San Diego, CA (US) 92126

( * ) Notice: Subject to any disclaimer, the term of this patent is extended or adjusted under 35 U.S.C. 154(b) by 529 days.

(21) Appl. No.: 11/459,148

(22) Filed: Jul. 21, 2006

(65) Prior Publication Data

US 2008/0018781 A1    Jan. 24, 2008

(51) Int. Cl.
*G03B 11/04* (2006.01)
(52) U.S. Cl. .................. 396/534; 396/544; 359/601
(58) Field of Classification Search .............. 396/534; 359/450, 612, 601; 348/838, 375
See application file for complete search history.

(56) References Cited

U.S. PATENT DOCUMENTS

| | | | | |
|---|---|---|---|---|
| 4,605,291 A | * | 8/1986 | Jolly | 359/862 |
| 5,622,344 A | * | 4/1997 | Gracie | 248/171 |
| 6,419,367 B1 | * | 7/2002 | Dion et al. | 359/612 |
| 7,083,291 B1 | * | 8/2006 | Yong et al. | 359/612 |
| 7,196,742 B2 | * | 3/2007 | Skjellerup et al. | 348/834 |

* cited by examiner

*Primary Examiner*—W B Perkey
*Assistant Examiner*—Noam Reisner
(74) *Attorney, Agent, or Firm*—Frank G. Morkunas

(57) ABSTRACT

A video camera monitor shield for use with a video camera which has a hood for covering the LCD monitor of a video camera, a base member with an upward extending rod at its front to which the hood adjustably connects. The hood on the rod is adjustable up an down on the rod and is adjustable side to side as necessary to accommodate any size and type of video camera and LCD monitor

23 Claims, 3 Drawing Sheets

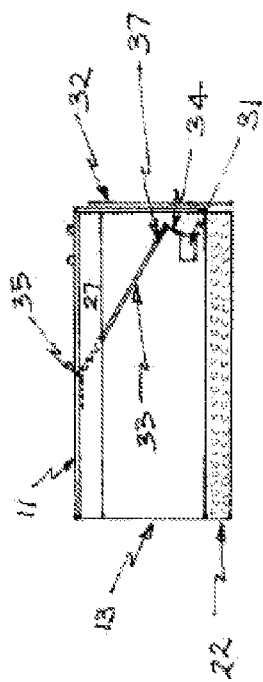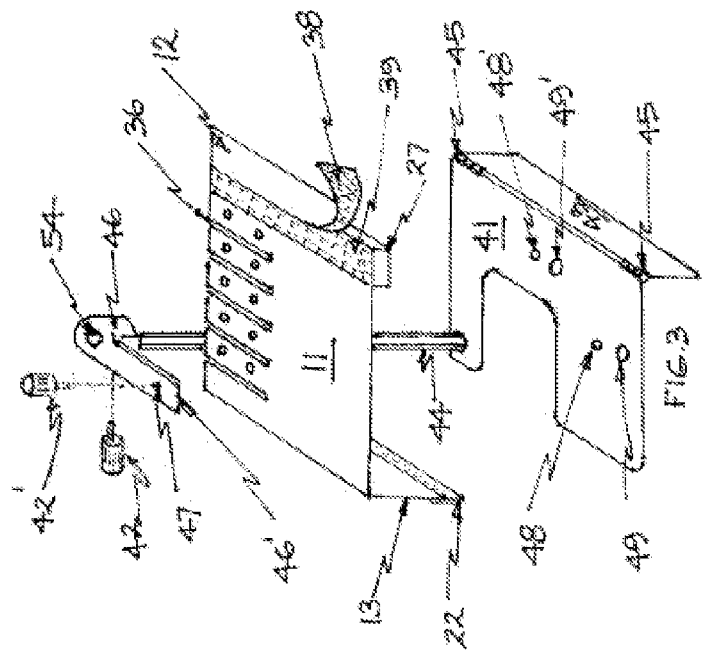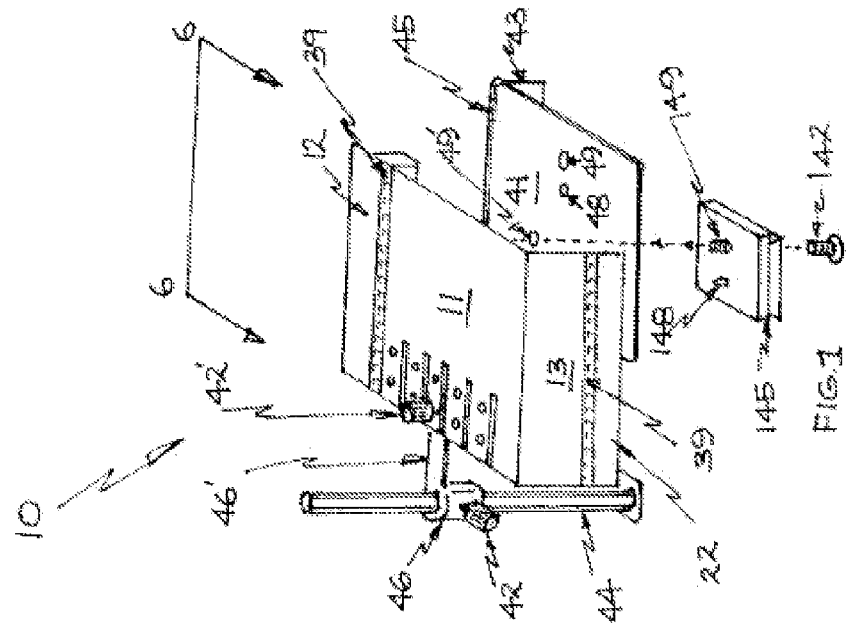

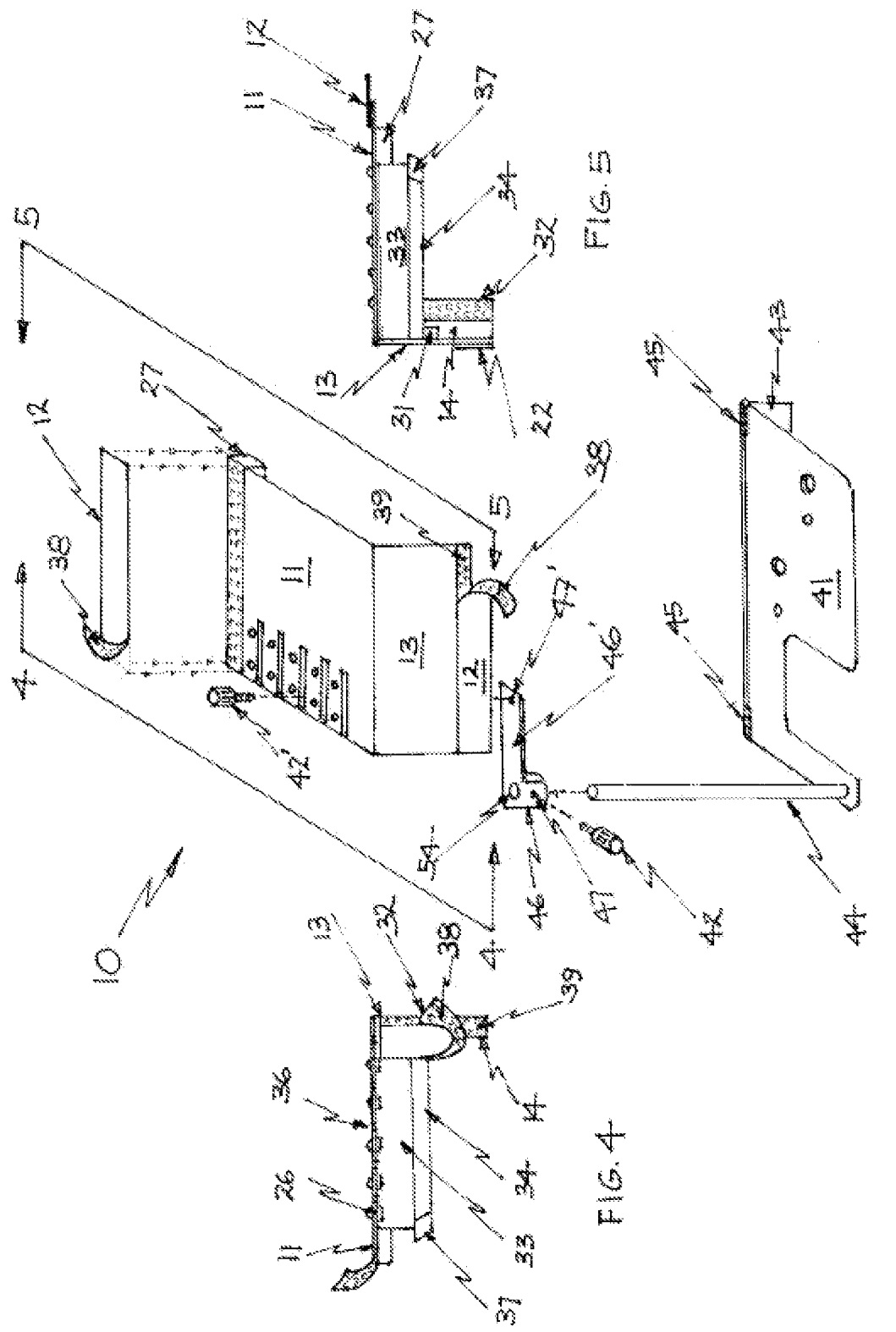

VIDEO CAMERA MONITOR SHIELD

CROSS REFERENCES TO RELATED APPLICATIONS

None.

STATEMENT REGARDING FEDERALLY-SPONSORED RESEARCH OR DEVELOPMENT

Not applicable.

BACKGROUND

This device of the present disclosure relates to an improvement in video cameras and video camera recording, and more particularly to preventing or greatly reducing excess sunlight or other external or internal light sources, natural or artificial, from detracting from the recording process.

Over the course of years, video cameras have undergone numerous modifications and improvements as to ease of use, quality of recording, and duration of recording capabilities. As to quality, many video cameras have the ability to self-adjust for light exposure thereby making great strides to ensure top quality results for recordings. The addition of LCD viewing or monitors has further simplified the recording process and allows the user to see, in real time and actual quality, to the extent possible, what is being recorded.

The LCD monitors on video cameras have undergone many modifications and enhancements, one of which is having the LCD monitor attached nearly flush to the side of the video camera in such a fashion as to permit the LCD monitor to open from the side of the video camera and swing outward like a door. This provides for a greater ability for the user to view the subject matter of what the user is recording. Once swung open, the LCD monitors may also be rotated and angled as desired for further ease of viewing while recording.

The only drawback to the extended swinging and rotating of the LCD monitor is, that if too much external lighting is exposed to the LCD monitor, the picture on the LCD monitor is difficult to see by the user. The more excess lighting, such as sunlight for example, the greater the difficulty and, consequently, the less of the real-time picture being seen by the user.

No prior art device for use with video cameras allows the user to control, or virtually eliminate, all the sunlight and other external artificial lighting from affecting, however minimally, the ability to see the LCD monitor as clearly as the subject matter is being recorded. The device of the present disclosure, the video camera monitor shield, fills that void and permits the user to virtually fully shield the LCD monitor of the video camera from sunlight and all other unwanted excess external lighting. By careful adjustments to the LCD monitor shield of the present disclosure, a user can allow only as much, if any, sunlight, or other external artificial light for that matter, to engage the LCD monitor and otherwise distort the user's real time viewing capability.

With the monitor shield of the present disclosure a user can control sun external lighting and thereby create a unique, professional, and artful recording which the user controls.

Accordingly, several objects and advantages of the monitor shield of the present disclosure are:

a. To virtually completely shield the LCD monitor of a video camera in use from unwanted external and internal lighting, be it sunlight or artificial lighting.

b. To permit a user to adjust the amount of external lighting the LCD monitor of a video camera receives from virtually no amount to full exposure or any amount in between as desired by the user.

c. To provide for a monitor shield device capable of mounting on virtually any type and model of video camera, single lens reflex camera, or other compact cameras having LCD monitors.

d. To create a monitor shield device which is relatively inexpensive to purchase and is extremely easy to use.

e. To provide maximum comfort and support for a user's palm by means of the side plate when the user is taking pictures/video without a tripod support or is taking pictures/video while holding the camera with one hand.

The foregoing has outlined some of the more pertinent objects of the monitor shield of the present disclosure. These objects should be construed to be merely illustrative of some of the more prominent features and applications of the monitor shield of the present disclosure. Many other beneficial results can be attained by applying the disclosed monitor shield of the present disclosure in a different manner or by modifying the monitor shield of the present disclosure within the scope of the disclosure. Accordingly, other objects and a fuller understanding of the monitor shield of the present disclosure may be had by referring to the summary of the monitor shield of the present disclosure and the detailed description of the preferred embodiment in addition to the scope of the monitor shield of the present disclosure defined by the claims taken in conjunction with the accompanying drawings.

SUMMARY

The above-noted problems, among others, are overcome by the monitor shield of the present disclosure. Briefly stated, the monitor shield of the present disclosure contemplates a video camera monitor shield for use with a video camera which has a hood for covering the LCD monitor of a video camera, a base member with an upward extending rod at its front to which the hood adjustably connects. The hood on the rod is adjustable up an down on the rod and is adjustable side to side as necessary to accommodate any size and type of video camera and LCD monitor. A plurality of removable, re-attachable, and adjustable extension shields are on the top of the hood, on the side of the hood, and on the front of the hood which are used, as necessary, to seal any gaps between the video camera and its LCD monitor and the video camera monitor shield.

The foregoing has outlined the more pertinent and important features of the monitor shield of the present disclosure in order that the detailed description that follows may be better understood so the present contributions to the art may be more fully appreciated. Additional features of the monitor shield of the present disclosure will be described hereinafter which form the subject of the claims. It should be appreciated by those skilled in the art that the conception and the disclosed specific embodiment may be readily utilized as a basis for modifying or designing other structures and methods for carrying out the same purposes of the monitor shield of the present disclosure. It also should be realized by those skilled in the art that such equivalent constructions and methods do not depart from the spirit and scope of the monitor shield of the present disclosure as set forth in the appended claims.

BRIEF DESCRIPTION OF THE DRAWINGS

For a fuller understanding of the nature and objects of the monitor shield of the present disclosure, reference should be had to the following detailed description taken in conjunction with the accompanying drawings in which:

FIG. 1 is a perspective view of the video camera monitor shield.

FIG. 2 is a detailed exploded perspective view of the video camera monitor shield.

FIG. 3 is a perspective view from the back side of the video camera monitor shield.

FIG. 4 is a front elevation view of upper member of the video camera monitor shield as taken on line 4-4 of FIG. 2.

FIG. 5 is a rear elevation view of upper member of the video camera monitor shield as taken on line 5-5 of FIG. 2.

FIG. 6 is a side elevation view of upper member of the video camera monitor shield as taken on line 6-6 of FIG. 1.

DETAILED DESCRIPTION

Figure 7:
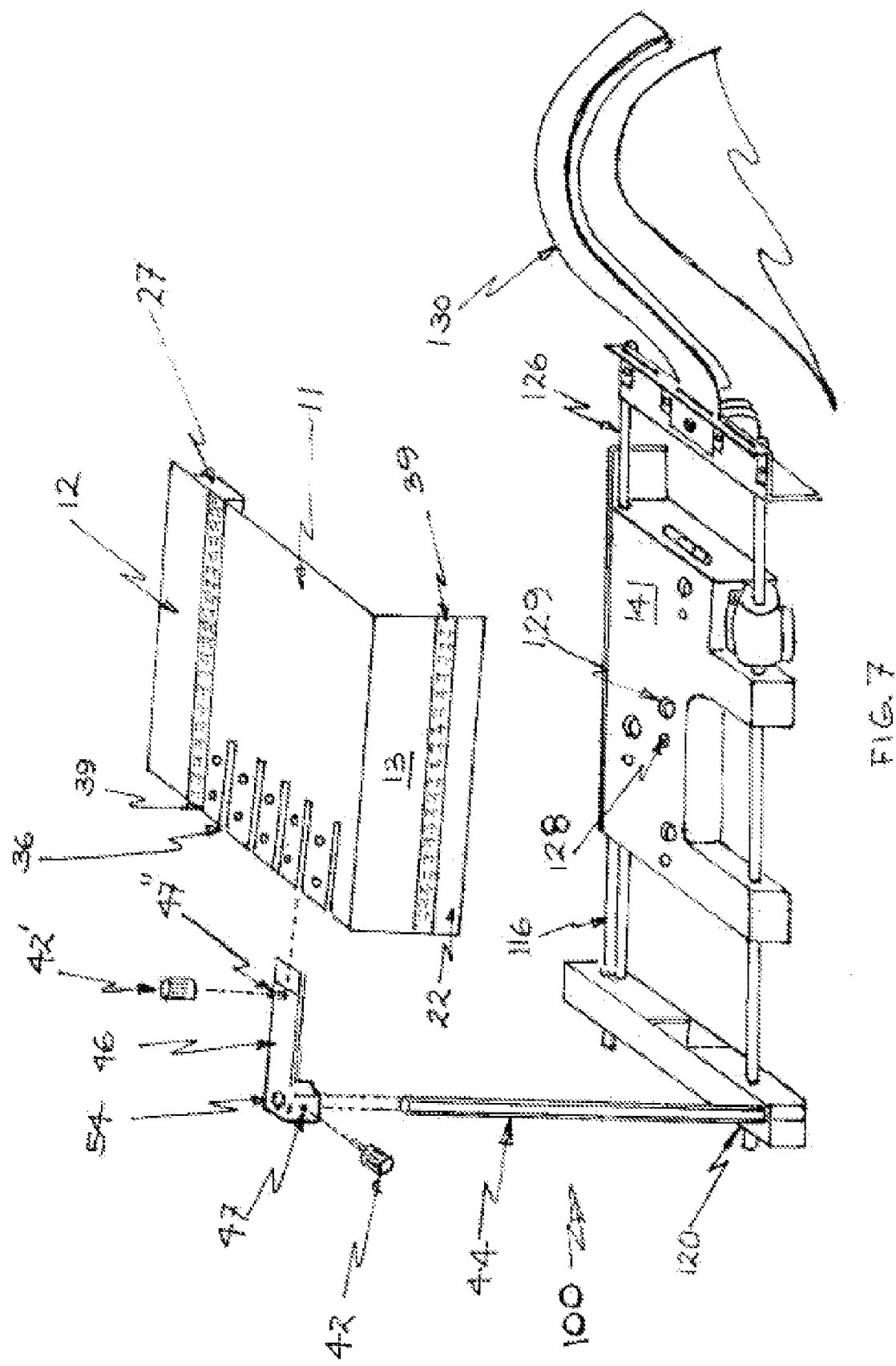
FIG. 7 is a detailed exploded perspective view of a second embodiment of the video camera monitor shield.

Referring now to the drawings in detail and in particular to FIG. 1, reference character 10 generally designates a video camera monitor shield constructed in accordance with a preferred embodiment of the present disclosure. FIG. 1 shows a hood comprised of an upper member 11 and a side member 13 attached along one side of the top edge of the upper member 11. Along the bottom edge of the side member 13 is a removable adjustable extension 22.

Along the top of the upper member 11, attached along the side opposite of the side member 13 and running approximately from front to rear thereat, is a removable adjustable extension 12. Each of the removable adjustable extensions 12, 22 are attached to their respective members [upper member 11 and side member 13] by a suitable fastening component such as, but not limited to, cooperating hook-and-loop fasteners 38, 39 [as illustrated in FIG. 3] commonly referred to by the trademark Velcro®.

It must be understood that the hook side of the hook-and-loop may be either on the respective extension 12, 22 with the loop side on the respective upper member 11 or side member 13 or such may be reversed with the loop on the respective extension 12, 22 and the hook on the respective member 11, 13. What is important is that the fasteners 38, 39 cooperate with the extensions 12, 22 and the respective member 11, 13.

The purpose of the extensions 12, 22 is to permit the user, once the video camera is attached to the monitor shield 10, to adjust the extensions accordingly, in-out, back-forth, side-to-side, angled, and the like such that the respective extensions 12, 22 maintain contact with the monitor shield and also are brought into direct contact with the video camera. This makes the monitor shield extremely flexible and able to accommodate virtually all makes, models, and sizes of video camera while still maximizing its light-shielding capabilities.

With a video camera which is tall, the side extension 22 is adjusted downward so that virtually no light gaps, if any, exist between the side extension 22 and the bottom member 41. With a video which is wide, the top extension 12 is adjusted outward from the upper member 11 and toward the video camera so that virtually no light gaps, if any, exist between the top extension 12 and the video camera.

As best illustrated in FIGS. 1-3, the base member 41 of the monitor shield 10 has a bottom extension 43 along the side below the top extension 12 of the upper member 11. This bottom extension is attached to the base member 41 by hinge components 45. Once a video camera is attached to the monitor shield 10, the hinged bottom extension 43 may be swung upward toward the video camera to come into contact with the video camera, be held thereat by the user's hand, and to thereby prevent unwanted external lighting from passing therethrough which would adversely affect the LCD monitor viewing capabilities.

An upward protruding rod 44 on the base member 41 serves to adjustably connect the hood 11, 13 to the base member 41. As illustrated in the figures, the rod 44 may be round, oval, squared, or multi-sided. An arm 46 with a aperture 54 similarly shaped as the rod circumference or outer perimeter fits slidingly onto the rod 44. A locking member 42 on the side of arm 46 is threadably connectable to the arm 46 thereat by a threaded aperture 47 in the side of the arm 46.

If the locking member 42 is threaded completely into the threaded aperture 47 of the arm 46 it would encroach into the arm aperture 54 and the space occupied by the rod 44. Tightening of the locking member 42 with the rod 44 in the arm 46 maintains its position. This structure permits a user to move the arm 46 up and down on the rod 44 to a desired height location and to lock the arm 46 in place thereat. This is extremely useful to accommodate different size video camera while still maintaining the full functionality and capability of the monitor shield 10.

Along the front of the upper member 11 are slits or channels 36 which extend rearward. The arm 46 also has an arm projection 46' with a locking member 42' which securingly threads into a corresponding aperture 47' on the top of the arm projection 46'. With the locking member 42' partially threaded into its respective aperture 47' a user will move the upper member 11 side to side, to the channel 36 which best accommodates the user's video camera. Once the correct side to side position for the particular video camera has been isolated, the user then may move the upper member 11 front to rear to also find and isolate the position which best accommodates the user's camera.

Once the best side-to-side position and front-to-rear position has been isolated, the user secures the locking member 42' into the threaded aperture 47'. It must be understood that any locking member suitable for the intended purpose may be used. Illustrated in the figures the locking members 42, 42' are conventional screw-type members having a cap on one end for grasping and facilitating turning. On the other end is a threaded extension protruding from the cap.

As illustrated in FIG. 7, the locking member 42' for the arm projection 46' may also be without a protruding threaded component but have an internally threaded female component. In such embodiment, the receiving male threaded component 47" would be on the arm projection 46'. This type of structure further facilitates placement of the arm 46 into the desired channel 36 and further facilitates securing the hood 11, 13 to the arm 46.

Reference is now made to FIG. 4. To facilitate the front to rear adjustments of the hood 11, 13 on the arm 46, and to register such movement, a plurality of guides 26 are on the underside of the upper member 11. The guides 26 are substantially parallel to the channels 36, are approximately equal in number as the number of channels 36, and are offset from the channels 36 but in alignment with the threaded aperture 47' and the threaded male component 47" on the arm projection 46'. The distance from the inner edge of one guide 26 to the inner edge of the adjacent guide 26 [referred to as W] is approximately equal to or slightly larger than the width of the arm projection 46' [referred to as W'].

As configured, and with dimensions W and W', a user can easily guide the arm projection 46' between any two guides 26 for side-to-side adjustment and, once therein, move the upper member 11 front to rear as needed for desired adjustments necessary to accommodate the particular video camera being used. Once the desired placement is isolated, locking member 42' is placed through the respective channel 36 under which the arm projection 46' resides, and into the threaded aperture 47'; or where a threaded male component 47" as the case may be.

Further side to side movement is prevented by the respective guides 26 on both sides of the arm projection 46'. As the user holds the upper member 11 steady to prevent front to rear movement, the user threads the locking member 42' securely into the threaded aperture 47' or threaded male component 47".

As so set up, a video camera may be attached to the monitor shield 10. The component parts have been described herein and in the order disclosed to assist in the understanding of the overall function and set-up of the monitor shield 10. Typically a user will first attach the video camera to the base member 41 to establish the size [height and width] of the video camera and the need for the adjustments and type of adjustments described above for the hood 11, 13.

Those adjustments are best made with the video camera attached to the base member 41. The video camera would attach to the base member via alignment apertures 48, 49 or 48', 49' on the base member 41. A conventional camera shoe 145 having guides 148, 149, align with respective alignment apertures 48, 49 or 48', 49'. Once so aligned, the lock nut 142 on the camera shoe 145 is secured to the video camera.

Reference is now made to FIG. 5 to describe additional structural features of the monitor shield 10. A vertical side plate 14 is on the front of the side member 13 and extends approximately from the bottom of the side member 13 to the under side of the upper member 11. A removable adjustable extension 32 is affixed to this side plate 14. This removable adjustable extension 32 is similar in structure, function, and fastener type as the previously described extensions 12, 22 on the upper member 11 and on the side member 13, respectively.

Reference to FIGS. 5 and 6 reveal an inner plate or flap 33 attached hingedly 35 to the bottom of the upper member 11. The width of this plate 33 is slightly less than the width of the upper member 11. When the video camera LCD monitor is not in an open mode, the plate 33 pivots downward toward the base member 41.

A stopper 31 on the inside of the side member 13 prevents the plate 33 from contacting the base member 41. This "hold" position facilitates use of the monitor shield 10 in this regard. If the plate 33 was in contact with the base member 41, and the user attempted to open the LCD monitor for use, the position of the flap 33 would severely impede the opening of the LCD monitor or restrict the user's ability to open the LCD monitor completely.

With the plate 33 in the "hold" position, above the base member 41, the LCD monitor is easily opened, comes into contact the plate 33, and easily pivots the plate 33 upward without restriction. A downward extension 34 on the front end of the plate 33 also aids in limiting unwanted external lighting from contacting the LCD monitor. A cushion member 37 on the downward extension 34 prevents the LCD monitor from sustaining damage from the plate 33.

A similar cushion member 27 is on the underside of the upper member 11 along its far edge, the edge on the opposite side of the side member 13, and runs approximately from front to rear thereat. The purpose of this cushion member 27 is to protect the video camera from sustaining any damage while attached to the monitor shield 10.

FIG. 7 illustrates another embodiment of the monitor shield 100 which has a base member 141 with telescoping features similar to those described in my pending application Ser. Nos. 10/916,910; 11/080,081; and 11/347,453; and my issued patent, U.S. Pat. No. 7,000,879; each of which are incorporated by reference herein.

The base member 141 of this embodiment has front telescoping rods 116 and rear telescoping rods 126. The front member 120 is attached to the front telescoping rod 116 and a shoulder support 130 is attached to the rear telescoping rod 126. The base member 141 also has alignment guides 128, 129 for alignment and attachment thereto of a video camera.

Extending upward from the front member 120 is a rod 44 onto which the arm 46 is slidingly and lockingly attached by locking member 42 through threaded aperture 47 on the arm 46. The arm 46 and its component parts as well as the hood 11, 13 and all its component parts are the same and function in the same manner as previously described hereinbefore. This embodiment permits being worn on the shoulder of a user and further adjusted forward and rearward by the front telescoping rod 116 and the rear telescoping rod 126.

The present disclosure includes that contained in the present claims as well as that of the foregoing description. Although this monitor shield of the present disclosure has been described in its preferred forms with a certain degree of particularity, it is understood that the present disclosure of the preferred forms has been made only by way of example and numerous changes in the details of construction and combination and arrangement of parts may be resorted to without departing from the spirit and scope of the monitor shield of the present disclosure. Accordingly, the scope of the monitor shield of the present disclosure should be determined not by the embodiment[s] illustrated, but by the appended claims and their legal equivalents.

Applicant[s] have attempted to disclose all the embodiment[s] of the monitor shield of the present disclosure that could be reasonably foreseen. It must be understood, however, that there may be unforeseeable insubstantial modifications to monitor shield of the present disclosure that remain as equivalents and thereby falling within the scope of the monitor shield of the present disclosure.

What is claimed is:

1. A video camera monitor shield, for use with a video camera, comprising:
   (a) a hood having an upper member having a front, a back, and an underside, and a side member having a front and a bottom, said side member attached to said upper member;
   (b) a base member with a front and a rear having an upward extending rod at the front;
   (c) first adjustment means on said rod and attachable to said hood, said first adjustment means for adjusting said hood up or down on said rod; and
   (d) a top adjustable extension on said upper member.

2. The video camera monitor shield of claim 1 wherein said first adjustment means comprises an arm translatable and lockable in a desired up and down position on said rod.

3. The video camera monitor shield of claim 2 further comprising a second adjustment means on said hood and said arm for adjusting said hood left and right on said arm and forward and rearward on said arm.

4. The video camera monitor shield of claim 3 further comprising a first locking means for locking said hood in a desired left or right position and forward and rearward position on said arm.

5. The video camera monitor shield of claim 3 wherein said second adjustment means comprises a plurality of channels on said upper member, said plurality of channels extend from said front of said upper member and rearward.

6. The video camera monitor shield of claim 3 wherein said second adjustment means comprises a plurality of guides on the underside of said upper member, said plurality of guides extend from said front of said upper member and rearward parallel to and offset from said plurality of channels.

7. The video camera monitor shield of claim 1 further comprising a fastening member on said top adjustable extension with a cooperating fastening member on said upper member for moving, placing, and removably securing said top adjustable extension to and at a desired position.

8. The video camera monitor shield of claim 1 further comprising a side bottom adjustable extension at the bottom of said side member.

9. The video camera monitor shield of claim 8 further comprising a fastening member on said side bottom adjustable extension with a cooperating fastening member at the bottom of said side member for moving, placing, and removably securing said side bottom adjustable extension to and at a desired position.

10. The video camera monitor shield of claim 1 further comprising a side front adjustable extension at the front of said side member.

11. The video camera monitor shield of claim 10 further comprising a fastening member on said side front adjustable extension with a cooperating fastening member at the front of said side member for moving, placing, and removably securing said side front adjustable extension to and at a desired position.

12. The video camera monitor shield of claim 1 further comprising a movable plate hingedly attached to the underside of said upper member.

13. The video camera monitor shield of claim 12 further comprising plate protective means on said movable plate for preventing said plate from damaging the video camera monitor when the video camera is attached to said video camera monitor shield.

14. The video camera monitor shield of claim 12 further comprising a plate adjustable extension on said movable plate.

15. The video camera monitor shield of claim 14 further comprising a fastening member on said plate adjustable extension with a cooperating fastening member on said movable plate for moving, placing, and removably securing said plate adjustable extension to and at a desired position.

16. The video camera monitor shield of claim 14 further comprising stopping means on said side member for preventing said plate from pivoting below said stopping means.

17. The video camera monitor shield of claim 1 further comprising upper protective means on the underside of said upper member for preventing damage to the video camera when attached to said video camera monitor shield.

18. The video camera monitor shield of claim 1 further comprising a downward extending hinged extension on said base member.

19. A video camera monitor shield, for use with a video camera, comprising:
   (a) a hood having an upper member having a front, a back, and an underside, and a side member having a front and a bottom, said side member attached to said upper member;
   (b) a base member with a front and a rear having an upward extending rod at the front;
   (c) first adjustment means on said rod and attachable to said hood, said first adjustment means for adjusting said hood up or down on said rod; and
   (d) a side bottom adjustable extension at the bottom of said side member.

20. A video camera monitor shield, for use with a video camera, comprising:
   (a) a hood having an upper member having a front, a back, and an underside, and a side member having a front and a bottom, said side member attached to said upper member;
   (b) a base member with a front and a rear having an upward extending rod at the front;
   (c) first adjustment means on said rod and attachable to said hood, said first adjustment means for adjusting said hood up or down on said rod; and
   (d) a side front adjustable extension at the front of said side member.

21. A video camera monitor shield, for use with a video camera, comprising:
   (a) a hood having an upper member having a front, a back, and an underside, and a side member having a front and a bottom, said side member attached to said upper member;
   (b) a base member with a front and a rear having an upward extending rod at the front;
   (c) first adjustment means on said rod and attachable to said hood, said first adjustment means for adjusting said hood up or down on said rod; and
   (d) a movable plate hingedly attached to the underside of said upper member.

22. A video camera monitor shield, for use with a video camera, comprising:
   (a) a hood having an upper member having a front, a back, and an underside, and a side member having a front and a bottom, said side member attached to said upper member;
   (b) a base member with a front and a rear having an upward extending rod at the front;
   (c) first adjustment means on said rod and attachable to said hood, said first adjustment means for adjusting said hood up or down on said rod; and
   (d) upper protective means on the underside of said upper member for preventing damage to the video camera when attached to said video camera monitor shield.

23. A video camera monitor shield, for use with a video camera, comprising:
   (a) a hood having an upper member having a front, a back, and an underside, and a side member having a front and a bottom, said side member attached to said upper member;
   (b) a base member with a front and a rear having an upward extending rod at the front; (c) first adjustment means on said rod and attachable to said hood, said first adjustment means for adjusting said hood up or down on said rod; and
   (d) a downward extending hinged extension on said base member.

* * * * *